US008204280B2

(12) United States Patent
Kluesing et al.

(10) Patent No.: US 8,204,280 B2
(45) Date of Patent: Jun. 19, 2012

(54) METHOD AND SYSTEM FOR DETERMINING ATTRACTION IN ONLINE COMMUNITIES

(75) Inventors: Daniel Kluesing, San Jose, CA (US); Max Crane, Del Mar, CA (US); David McIntosh, Del Mar, CA (US); Darian Shirazi, Atherton, CA (US)

(73) Assignee: Redux, Inc., Berkeley, CA (US)

(*) Notice: Subject to any disclaimer, the term of this patent is extended or adjusted under 35 U.S.C. 154(b) by 993 days.

(21) Appl. No.: 12/114,226

(22) Filed: May 2, 2008

(65) Prior Publication Data

US 2008/0279419 A1 Nov. 13, 2008

Related U.S. Application Data

(60) Provisional application No. 60/917,021, filed on May 9, 2007.

(51) Int. Cl.
*G06K 9/00* (2006.01)
(52) U.S. Cl. .................................................. 382/118
(58) Field of Classification Search .................. 382/118
See application file for complete search history.

(56) References Cited

U.S. PATENT DOCUMENTS

| | | | | |
|---|---|---|---|---|
| 2004/0210661 | A1* | 10/2004 | Thompson | 709/228 |
| 2005/0043897 | A1* | 2/2005 | Meyer | 702/19 |
| 2007/0150340 | A1* | 6/2007 | Cartmell | 705/14 |

OTHER PUBLICATIONS

Walker et al., Using a Human Face in an Interface, Apr. 24-28, 1994, ACM, pp. 85-91.*

* cited by examiner

*Primary Examiner* — Matthew Bella
*Assistant Examiner* — Dennis Rosario
(74) *Attorney, Agent, or Firm* — Kilpatrick Townsend & Townsend LLP; David B. Raczkowski

(57) ABSTRACT

The pairing of members in the online community based on at least physical preferences and displaying to a person advertisements depicting people whom that specific person is attracted are provided. The invention can provide face similarity technology to match a member with people they will find attractive based on preference data from the user. For example, profiles of people who look similar to other people that the member has indicated to be attractive can be provided to the member. Additionally, using mutual attraction criteria, the invention can answer the age old 'Does she/he even like me?' question before users even sit down on the first date, thus enabling users to enjoy high quality and compatible dates knowing the feeling of attraction is mutual. The face similarity technology can also be used to provide advertisements depicting people that a person finds attractive.

4 Claims, 7 Drawing Sheets

METHOD AND SYSTEM FOR DETERMINING ATTRACTION IN ONLINE COMMUNITIES

CLAIM OF PRIORITY

This application claims the benefit of provisional U.S. Application No. 60/917,021, filed May 9, 2007, entitled "METHOD AND SYSTEM FOR DETERMINING MUTUAL ATTRACTION IN ONLINE COMMUNITIES", the disclosure of which is incorporated herein by reference in its entirety.

CROSS-REFERENCES TO RELATED APPLICATIONS

This application is related to provisional U.S. Application No. 60/978,894, filed Oct. 10, 2007, entitled "SYSTEM AND METHOD FOR ADVERTISING USING IMAGE RECOGNITION", the disclosure of which is incorporated herein by reference in its entirety.

BACKGROUND OF THE INVENTION

The present invention is generally related to online communities, and specifically to pairing members in the online community and providing directed advertisements to the members.

Physical appearance is perhaps the most important component used to evaluate users of dating services, such as may be provided by online social networks. However, current dating services only let users provide very basic preferences, such as body type, ethnicity, and hair color. Additionally, these features are not checked for accuracy. Thus, a user needs to search through many profiles to find someone who he/she actually finds attractive, which can be very time consuming.

Even if a person finds another user/member to be attractive, that person has no idea whether or not the other users would find that person attractive. Again, the person will waste a lot of time pursuing members that are not attracted to that person.

Additionally, physical appearance is also an important characteristic in the marketing of products. For example, clothing is shown with models on which people find the clothing flattering. However, different people can find different people attractive, and thus an advertisement that works well with one person will not particularly work well with another person.

It is therefore desirable to provide methods, systems, and apparatus for providing suitably attractive matches to a user of a online social network, as well as providing more persuasive and attractive advertisements to that person.

BRIEF SUMMARY OF THE INVENTION

Embodiments of the present invention provide the pairing of members in the online community based on at least physical preferences. Other embodiments provide to members advertisements depicting people whom a particular member is attracted. In one aspect, the invention provides face similarity technology to match a user with people they will find attractive by providing profiles of people who look similar to other people that the user has indicated to be attractive. "Learning algorithms" of the invention make matches more accurate with a growing number of members. Additionally, using mutual attraction criteria, the invention can answer the age old 'Does she even like me?' question before users even sit down on the first date, thus enabling users to enjoy high quality and compatible dates knowing the feeling of attraction is mutual. In another aspect, the face similarity technology is used to provide advertisements depicting people that a user finds attractive.

As user herein, a facial feature is any aspect of a person's face that results from a decomposition of one or more images of that person. The feature may correspond to a particular size and shape of a specific body part (such as a nose, cheeks, lips, etc.) or an aspect of the entire face (e.g. symmetry of the face). A facial feature may be represented as a single number as a result of a decomposition of a feature or aspect of a face, or a set of numbers from the decomposition. Also, as used herein, the term "social network" includes any free or fee-based online community, such as a dating website, chat room, message board, news service, etc.

According to one exemplary embodiment, a method for pairing members of an online social network is provided. For each of a plurality of members, one or more images that include a face of that member are received. Preference data relating at least a portion of one or more facial images to which the first member is attracted is also received. From the preference data, a numerical representation for each of one or more reference facial features to which the first member is attracted is determined. A first preferred group of members is then selected by comparing numerical representations of facial features of each member to the numerical representations for the reference facial features. One or more members of the first preferred group are then provided to the first member.

According to another exemplary embodiment, a method for pairing members of an online social network based on mutual attraction is provided. For each of a plurality of members, one or more images that include a face of that member are received. Preference data relating one or more facial images to which that member is attracted are received.

For each of at least a portion of members, a numerical representation for each of one or more reference facial features to which a member is attracted is determined based on the preference data. A preferred group of members is selected by comparing numerical representations of each member to the numerical representations for the reference facial features for that member. For a first member, a first mutual attraction group is determined from at least a portion of the selected preferred groups. One or more members of the first mutual attraction group are provided to the first member.

According to another exemplary embodiment, a method of providing an advertisement is provided. Preference data relating one or more facial images to which a first user is attracted is received. From the preference data, a numerical representation for each of one or more reference facial features to which the first user is attracted is determined. Numerical representations of facial features from face images that are available for displaying in an advertisement are compared to the numerical representations for the reference facial features. Based on the comparison, a face is selected from the face images that are available for displaying in an advertisement. An advertisement displaying the selected face is then providing to the first user.

A computer program product containing a computer readable medium having instructions for controlling a processor to perform any of the methods described herein is also provided. System that are programmed or constructed to perform any of the methods described herein are also provided.

A better understanding of the nature and advantages of the present invention may be gained with reference to the following detailed description and the accompanying drawings.

DETAILED DESCRIPTION OF THE INVENTION

Embodiments of the present invention provide the pairing of members in the online community based on at least physical preferences. Other embodiments provide to members advertisements depicting people whom a particular member is attracted. In one aspect, the invention provides face similarity techniques to match a user with people they will find attractive by providing profiles of people who look similar to other people that the user has indicated to be attractive. The face similarity techniques determine a numerical representation for different features.

"Learning algorithms" of the invention make matches more accurate with a growing number of members. Additionally, using mutual attraction criteria, the invention can answer the age old 'Does she even like me?' question before users even sit down on the first date, thus enabling users to enjoy high quality and compatible dates knowing the feeling of attraction is mutual. In another aspect, the face similarity technology is used to provide advertisements depicting people that a user finds attractive.

I. Providing Attractive Profiles Based on Preferences

Figure 1:
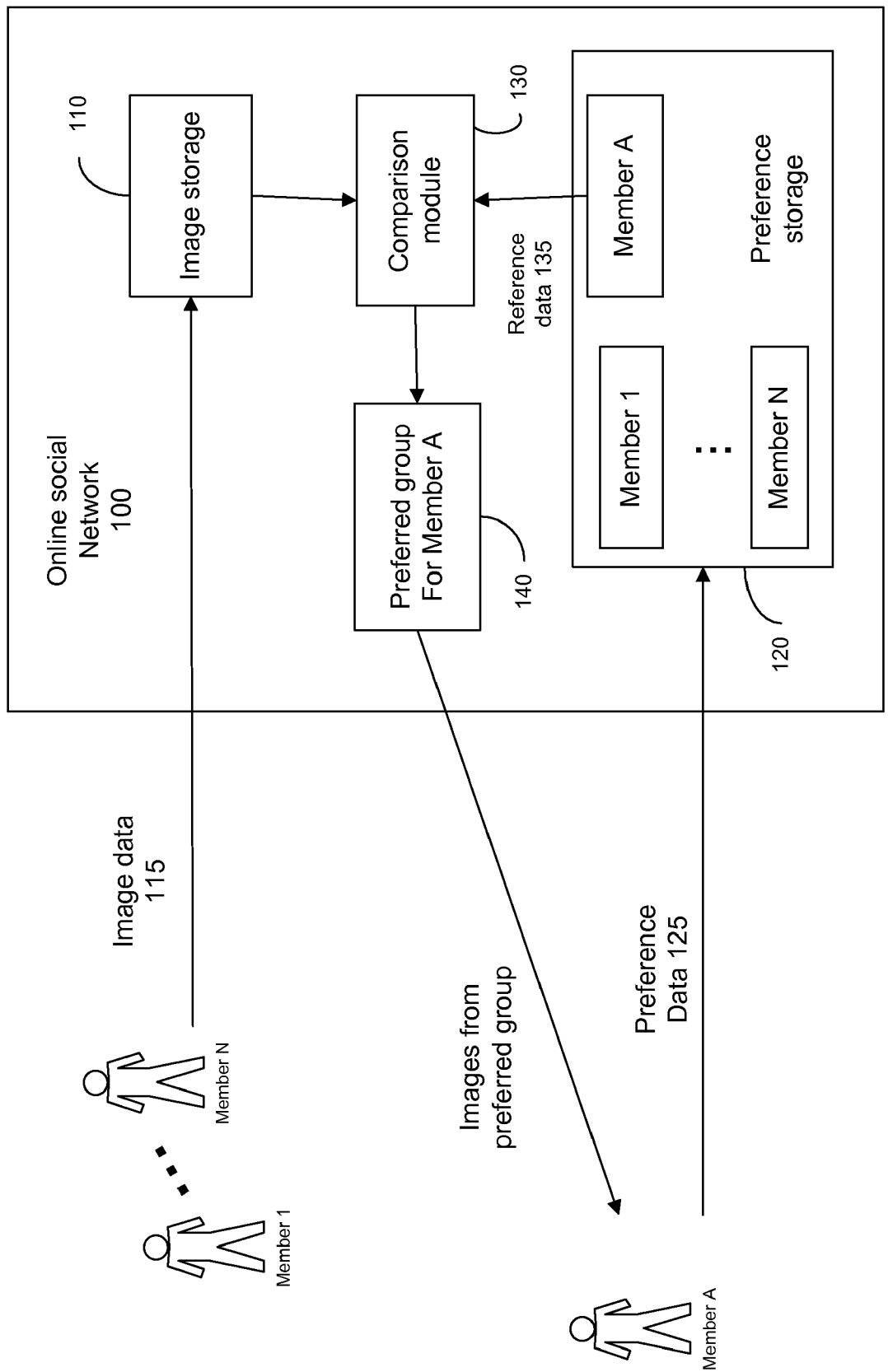
FIG. 1 is a block diagram of an online social network that provides attractive profiles to a user based on that user's preferences according to an embodiment of the present invention.

FIG. 1 is a block diagram of an online social network 100 that provides attractive profiles to a user based on that user's preferences according to an embodiment of the present invention. In one embodiment, online social network 100 may be configured primarily as a dating service. In other embodiments, online social network 100 may be centered around a particular geography (e.g. 50 miles within a particular city), hobby, activity (e.g. running), purpose (e.g. providing reviews), or other central theme.

In one aspect, online social network 100 functions as a server comprised of one or more computer systems connected to the Internet. An exemplary computer system is describe later. The server may provide a website, which while intended for dating, also has a social component which allows people to find friends. Features include online chatting, messaging, and media sharing.

To become a member of the online social network 100, typically a person fills out a questionnaire regarding personal characteristics and interests of the person, thus creating a profile. The questionnaire may be provided over a network, such as the Internet, in an interactive fashion or by uploading the questionnaire. Other more rudimentary manners such as using a postal or parcel service may be used as well. The profile information can include age, gender, location, interests and personality.

In addition to the questionnaire, a person also provides image data 115 of himself/herself, which is uploaded or entered into an image storage 110. As shown, members 1 thru N have provided images to the image storage 110. In one embodiment, image storage 110 is a database, which may have separate or redundant disks at many different sites. In another embodiment, image storage 110 is one or more simple memory devices, such as a magnetic or optical disk drive.

As depicted, it is to be determined which of the members 1-N would member A probably find attractive. For ease of description, member A is shown separately from member 1-N. However, member A may have also provided image data. It is also assumed that the members 1-N are of a gender that member A finds attractive. In one embodiment, the preferred group is of a different gender. In another embodiment, the preferred group is of a same gender.

Member A provides preference data 125 to a preference storage 120, which may be the same storage facility as image storage 110. Preference data 125 may be provided in similar ways as image data 105. For example, member A may upload a file of a person that member A finds attractive. Member A may also rate images provided by social network 100, e.g. using slider bar or by directly ranking a set of pictures. The preferences of additional members may also be stored in preference storage 120.

In one embodiment, the preferences are compiled to define reference data 135 of facial features to which other faces will be compared. For example, if only a single photo of a person that member A finds attractive has been uploaded then the features of that single photo would define the reference data 135. As will be described in more detail later, a decomposition (such as a wavelet decomposition) may be performed to convert different features into a numerical representation (such as the expansion coefficients of the wavelets). Thus, a plurality of facial features can each have a value associated with it. Other basis functions may be used for the decomposition besides wavelets, such as a Fourier expansion. For example, where the basis functions are points on a numerical grid (such as pixels), the coefficients would be the values of the colors at that grid point. The coefficients in one decomposition may be expressed in a new decomposition, where the number of basis functions may differ from one decomposition to another.

A comparison module 130 receives the reference data 135 and compares a plurality of the images from the image data 125 to the reference data 135. The comparison module may also compute the reference data 135 dynamically from the preference data 125.

In one embodiment, each of the members 1-N are ranked based on their similarity to the reference data 135. In one aspect, comparison module 130 outputs a list of the highest ranked members as a preferred group 140. For example, a threshold may be used to take the highest 10% or the top M (e.g. 100) members for creating the preferred group 140. In another embodiment, a raw similarity measure is compared against a threshold similarity measure, such as a distance, and all members within that similarity measure are put into the preferred group 140.

In another embodiment, other information regarding a member besides the image data may be used to determine whether a member is to be included in the preferred group 140. For example, information (attributes) provided in the profile (such as interests, hobbies, activities and levels of interests or involvement in such) may be compared to determine similarities or dissimilarities. Additionally, other attributes may be inferred from events attended, objects in image data provided by that member, items or services purchased (such as music, clothes, magazines, . . . ), or even websites visited.

Then, one or more images from the preferred group are sent to the member A, for instance, by sending an e-mail to that member A's account with the social network 100. This sending of images can serve as a type of introduction. The sending of the one or more images from the preferred group to Member A may be prompted by a request from Member A, e.g., by a search request from Member A. The search can include other features of a profile that a member prefers.

Figure 2:
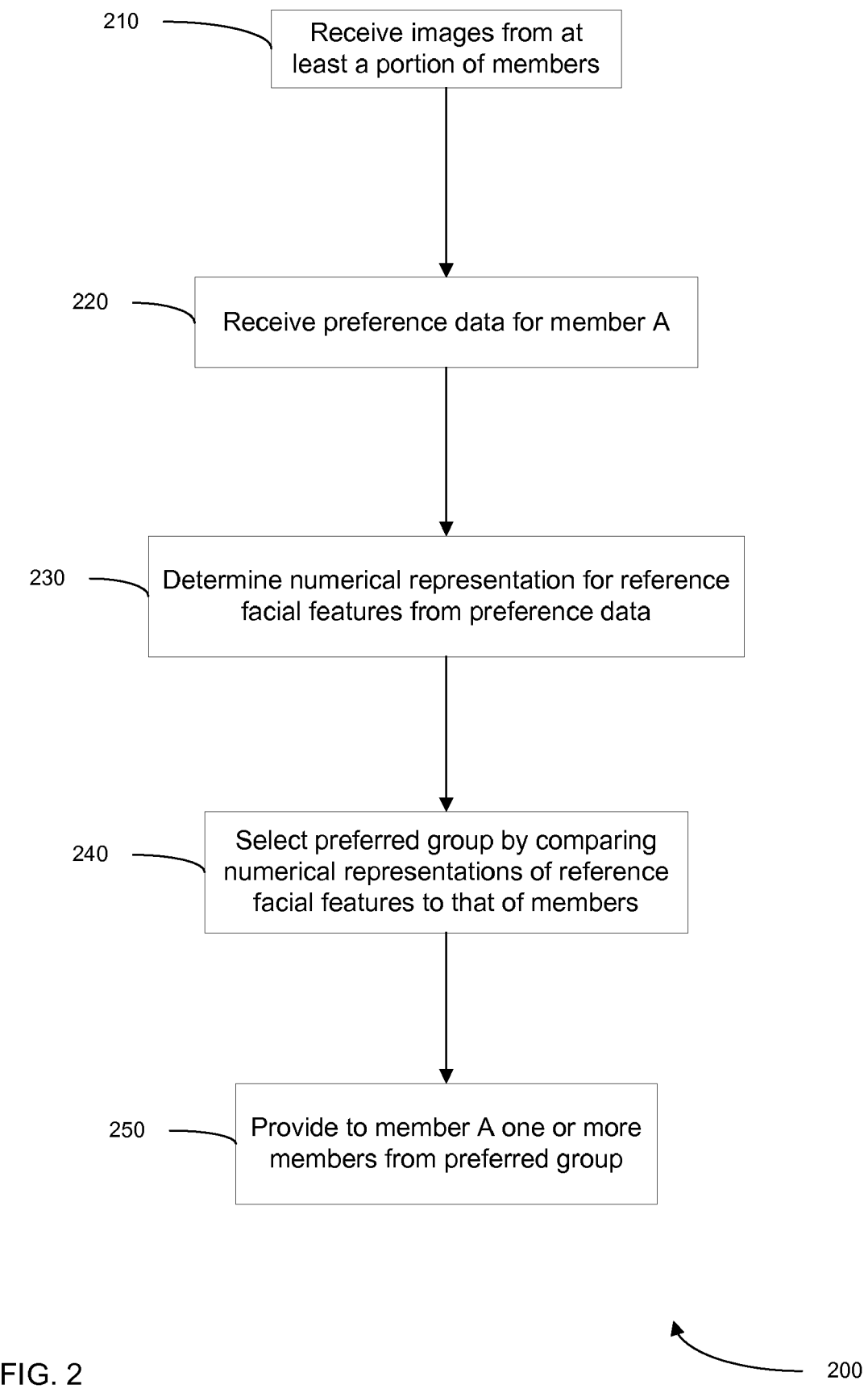
FIG. 2 is a flow diagram illustrating a method for pairing members of an online social network according to an embodiment of the present invention.

FIG. 2 is a flow diagram illustrating a method 200 for pairing members of an online social network according to an embodiment of the present invention. In step 210, images from at least a portion of the members are received, e.g. by social network 100. For example, for each of the members 1-N, one or more images of a particular member is received. At least one of the images for each member includes a face. Facial recognition software may be used to identify the face of the member in the image. The images may be of any format, such as a JPEG, GIF, bitmap, or even a hard copy. In one embodiment, the images of the members may be enhanced.

In step 220, preference data for a member A is received by social network 100. The preference data conveys information regarding one or more facial images to which member A is attracted.

In one embodiment, the user uploads a reference image to which other images are to be compared. In another embodiment, the service provides sample images to the user, who then provides feedback about specific features or about an entire face. In one aspect, the feedback is implicit, e.g. which images the user clicks on. In another aspect, the feedback is explicit, e.g. the user rates the image using mechanisms such as slider bars, buttons, or a numerical field. In another example, a member ranks a set of pictures by attractiveness.

In one embodiment, the preference data may be obtained by providing sample images to the member. The sample images provided to the user may be other members or of other people whose pictures are accessible, e.g., in a catalogue of sample images. A member rates a person that he/she finds attractive which allows an algorithm according to the invention to learn their preferences. From these preferences, the system finds people who meet the user's criteria.

In conjunction with a member's preference data, preferences of other people or other members (i.e. collaborative preferences) may be used to estimate a member's preferences on unseen images. Thus, in a further embodiment, the invention provides a method combining learned preferences from a large population. For example, it may be learned that people who like high cheek bones also like a narrow nose.

This estimate may be used, for example, to determine the eventual preferred group or to create more accurate preference data, which may involve the selection of which sample pictures to send for the member to rate. In one embodiment, the invention provides a method wherein the collaborative preferences are based on discrete items, e.g., blue eyes if a member likes blonde hair, or based on real valued attributes which compose the discrete items.

In step 230, a numerical representation for one or more reference facial features is determined from the preference data. This may be performed by comparison module 130 or by another processing module of social network 100. In one embodiment, a facial decomposition is performed to extract features from faces of sample images rated, ranked, or provided by a member and to determine the respective numerical representations. A facial feature is any aspect of a person's face that results from a decomposition of one or more images of that person. The feature may correspond to a particular size and shape of a nose, cheeks, lips, etc. or an aspect of the entire face (e.g. symmetry of the face).

In one embodiment, the numerical representation is a set of numbers for each feature, which can be considered a point or vector in a multi-dimensional space. In another embodiment where a user rates a particular facial feature of multiple images, a type of weighted average of the numerical representation of that feature from each image may be used to obtain the reference value.

As mentioned above, the preference data can include preferences from other members to from collaborative preferences. The preferences from the other members may then be used to determine at least one reference facial feature to which the first member is attracted.

Finer grains of accuracy with regards to the reference facial features can be obtained by obtaining more preference data. For example, a person can provide whether one of two people is more attractive. Next, another person's image can then be compared against either of these people, and so on. Based on similarities on facial features between ranked (rated) members, the reference features can be obtained.

In step 240, a first preferred group is selected for member A. The numerical representations of facial features of a plurality of members are compared to the numerical representations for the reference facial features. For example, comparison module 130 can compute or receive the numerical representations of the member's images and compare the numerical representations to the reference data 135. Based on the comparisons, the preferred group 140 of members for member A can be produced.

The preference data may also indicate that a feature is not only preferred by required. Thus, in one embodiment, a member may explicitly provide an indication that that a specific facial feature has required characteristic, such as color, shape, texture, etc. The comparison module 130 can then make sure that the required specific facial feature is found in each member in the preferred group. The fact that a specific facial feature is required may also be implicitly determined from the preference data.

Other factors may be used to determine which members are selected for a preferred group, for example, certain interests may be selected by a member or used implicitly by social network 100, as may be done when the interests are shared with member A. Other interests may, for example, be determined from keywords used in a member's profile, selections of particular interests, purchasing of tickets to similar events, content that is downloaded or shared with other members, and using similar modes of media (such as chat, IM, . . . ).

In one embodiment, at least one of the images for each member also include part of that member's body. Preference data relating one or more body images to which the first member is attracted is received. From the body preference data, a numerical representation for each of one or more reference body features to which the first member is attracted is determined. Selecting the first preferred group of members includes comparing numerical representations of body features of each member to the numerical representations for the reference body features. In this manner, attraction to more than just a person's face can be accounted for.

In step 250, one or more members of the first preferred group is provided to member A. For example, images, links to the member's profiles, or just a name associated with the member may be sent. In one embodiment, a pre-specified number N (e.g. 5) of members may be sent to member A every day through any of a number mechanisms, such as e-mail or when the user activates a dynamic display. In one embodiment, the N members sent may be the top N ranked members that have not been sent to the member before. The images of the members in the first preferred group may also be provided when member A requests a listing or search of members in the preferred group. In one aspect, a member can change these preferences such that more or less images are sent.

Note also as mentioned above, members may be ranked as part of determining a preferred group for a member. In one embodiment, the ranking of a specific member in the preferred group of member A can be provided as well (i.e. in the top 10% or even a specific ranking). This may be done as a premium service. In another embodiment, the ranking of member A for the other member could also be provided to member A. Alternatively, member A may simply be told whether member A is in the preferred group of the member in question.

Note that this first preferred group of member A is determined without member A having to look at every profile in the group. Thus, member A does not have to waste time sifting through numerous non-desirable profiles.

II. Facial Detection and Similarity Methods

As described above, facial detection and similarity methods are used to determine facial features and faces to which a person will be attracted. The following discussion presents techniques for detecting a facial feature and for determining a similarity In one embodiment, in order to determine a numerical representation of facial features, a face is first determined. Thus, from the provided images, facial detection algorithms extract faces from images and associate them with users. In one aspect, at least one of the images has only the particular member's face so that if there is more than one face a subsequent image then that member's face can be identified.

Each face is analyzed to build a statistical model of the users face. Pixels are extracted that represent the member's face from an image. Rectification may be applied to obtain a standard and normalized model of the member's face.

Thus, in one embodiment, an image is enhanced by: detecting a face region in the profile image; cropping the profile image to isolate the detected face region; normalizing and rectifying the detected face region in the cropped image.

Figure 3A:
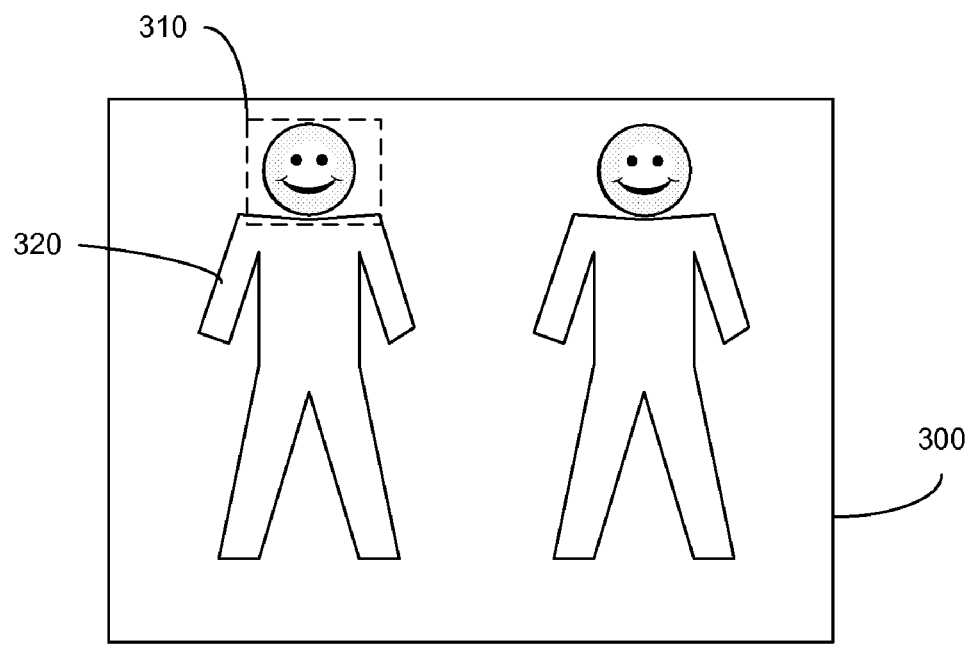
FIG. 3A shows an image where a face of a member is detected according to an embodiment of the present invention.

FIG. 3A shows an image 300 where a face of a member is detected according to an embodiment of the present invention. The pixels within the box 310 are identified as belonging to the face of the member 320 who is submitting the image 300. As mentioned above, the pixels within the box 310 can be further limited to only pixels directly belonging to the person's face.

More specific discussion as to facial detection methods and other methods discussed herein can be found in:

M. A. Turk and A. P. Pentland, "Face recognition using eigenfaces", Proc. IEEE Conf. Computer Vision and Pattern Recognition, pp. 586-591, 1991;

P. N. Belhumeur, J. P. Hespanha, and D. J. Kriegman, "Eigenfaces vs. Fisherfaces: recognition using class specific linear projection", European Conf. Computer Vision, pp. 45-58, 1996;

E. Osuna, R. Freund, and F. Girosi, "Training support vector machines: An application to face detection," Proc. Computer Vision and Pattern Recognition, pp. 130-136, San Juan, 1997;

J. S. DeBonet and P. A. Viola, "A non-parametric multi-scale statistical model for natural images", Advances in Neural Information Processing Systems (NIPS), vol. 10, 1998;

P. Viola and M. Jones, "Robust real-time face detection," Proc. International Conf. Computer Vision, vol. 2, p. 747, Vancouver, 2001;

M. S. Bartlett, J. R. Movellan, and T. J. Sejnowski, "Face recognition by Independent Component Analysis", IEEE Trans. on Neural Networks, Vol. 13, No. 6, pp. 1450-1464, 200; and Jia, K. and Gong, S., Multi-Modal Tensor Face for Simultaneous Super-Resolution and Recognition, ICCV05 2005, vol. II: p 1683-1690, each of which is incorporated by reference.

Once a model of the face has been isolated, a decomposition of the face may be done. A decomposition (such as a wavelet decomposition) may be performed to convert different features into a numerical representation (such as the coefficients of the wavelets). Thus, a plurality of facial features can each have a value associated with it.

In one embodiment, the invention provides a method wherein rotational transforms are applied to an image to generate multiple samples from a single example. A rotation may be used to determine features of the person as would be seen from a different perspective, which is termed one-shot learning as multiple views of a person can be learned from a single view.

In one embodiment, at least one of face skin tone, distance between pupils, profile line, nose-chin distance, length, and width of face proportionality are incorporated in detection, similarity, and/or decomposition. Such methods can also focus on only certain parts of the face (such as performing separate decompositions for the entire face, one for eyes, nose, . . . ).

Figure 3B:
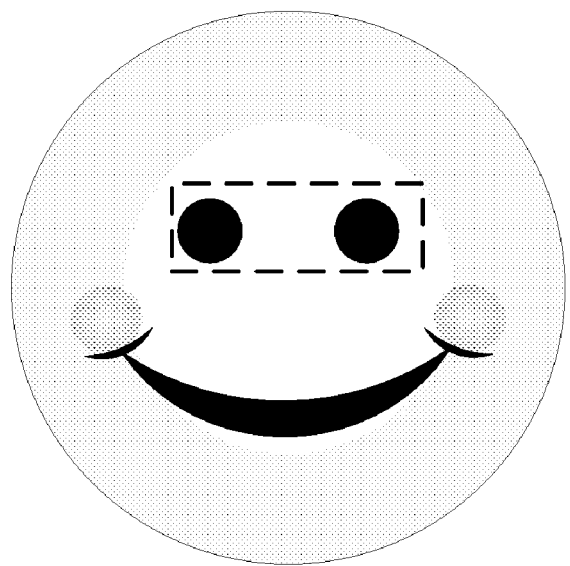
FIG. 3B shows a face where a specific portion has been chosen for decomposition according to an embodiment of the present invention.

FIG. 3B shows a face 350 where a specific portion has been chosen for decomposition according to an embodiment of the present invention. In this example, the portion 360 of the image related to the eyes has been chosen to be analyzed and decomposed. Pixels from the portion 360 can be analyzed to form numerical representations for features of the eyes, such as color, distance apart, shape, as well as aspects of eyelashes can be included. In this manner, certain discrete parts of a face may be rated separately from other parts of a face, thus providing greater accuracy in determining a member's preferences.

Exemplary methods for recognition, decomposition, and similarity determination may include: a linear or non linear subspace projection; single and multidimensional wavelet transforms; performing multi-resolution wavelet decompositions; performing eigenvalue based projections; tensor based projections; linear discriminate analysis; kernel discriminate analysis of arbitrary kernel functions; random projections; sequence of one or more projection methods applied in series; and regularization of the projection.

As described above, a given user's preferences are associated with the features extracted from faces and used to build a model of the given user's preference for specific facial features and the individuals on the service whose faces are closest (most similar) to the preferred model for the given user. Accordingly, a similarity measure is performed to determine whose faces are closest to the reference facial features.

In one embodiment, the similarity measure is a distance. For example, each numerical representation of a feature can be considered as a point in a certain direction. That point could be in one dimension, i.e. the feature is represented by one numerical value or function, or there could be multiple dimensions for each numerical value for a feature. The distance between features or an entire face can thus be determined in the multi-dimensional space created. In other embodiments, correlation function/tables or mutual information may also be used for determining a similarity measure.

The classifying of persons as being preferred or not may be facilitated with the use of supervised, unsupervised or semi-supervised machine learning algorithms are used to determine those facial features and/or faces that are most similar to a given user's preferences. One example is a support vector machine. Thus, a biggest margin of separation between two sets of points may be found, thus allowing doing non-linear mapping.

More specific discussion as to support vector machines and other methods discussed herein can be found in:

J. Platt, "Fast Training of Support Vector Machines using Sequential Minimal Optimization," in Advances in Kernel Methods—Support Vector Learning, B. Schölkopf, C. Burges, and A. Smola, eds., MIT Press, to appear, (1998);

C. J. C. Burges, "A tutorial on support vector machines for pattern recognition," Data Mining and Knowledge Discovery, 2(2):955-974, 1998.

(citeseer.ist.psu.edu/article/burges98tutorial.html); and

Fast mutliresolution image querying (grail.cs.washington.edu/projects/query/SIGGRAPH 2005.), each of which is incorporated by reference.

III. Mutual Attraction

As explained above, it can be efficient for an online social network to provide images of people that you will find attractive. However, for greater efficiency, the present invention realizes that physical attraction is a two way street. Thus, aspects of mutual attraction can also be accounted for.

Figure 4:
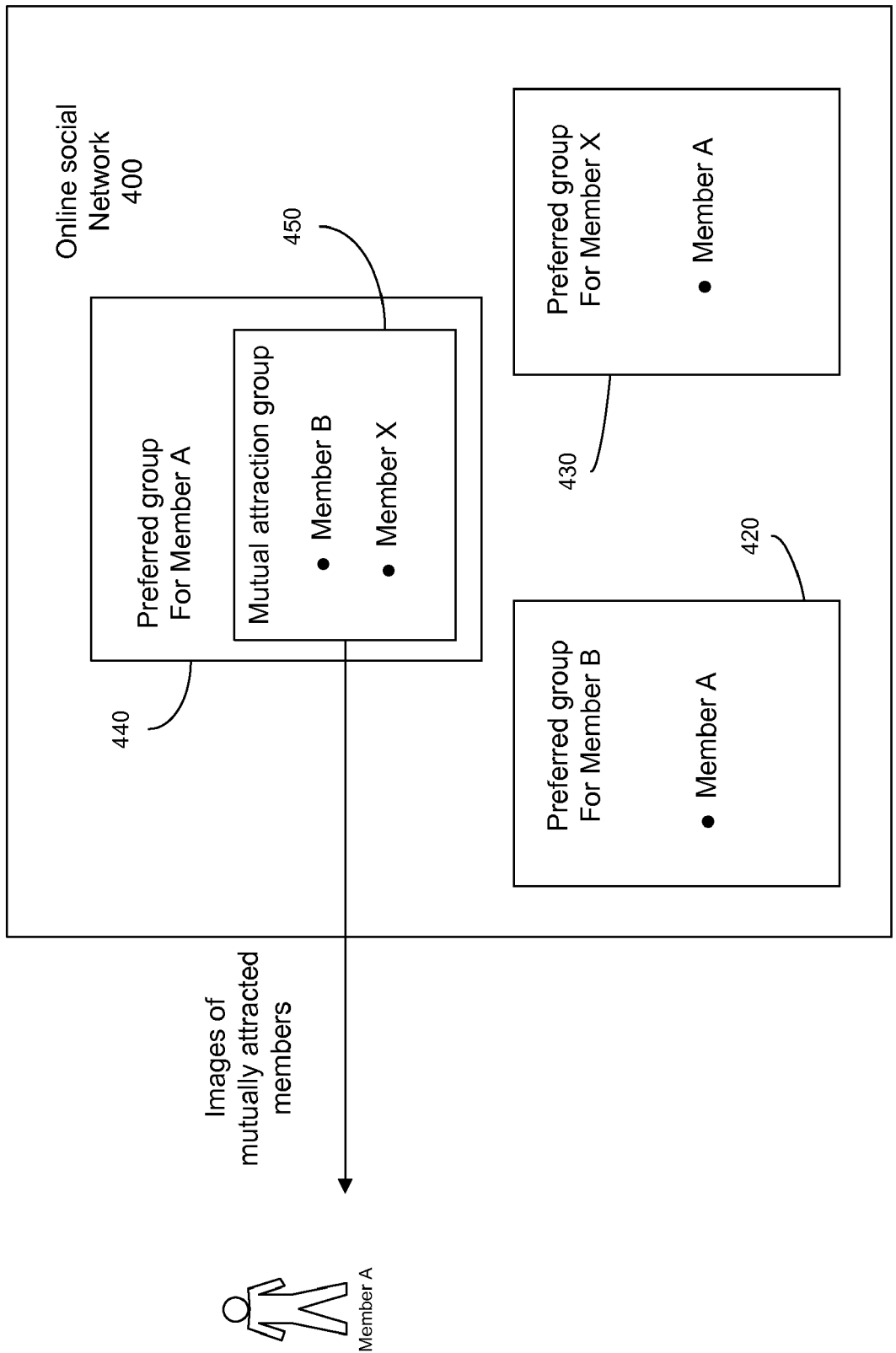
FIG. 4 is a block diagram of an online social network that provides a mutual attraction group to a member according to an embodiment of the present invention.

FIG. 4 is a block diagram of an online social network 400 that provides a mutual attraction group to a member according to an embodiment of the present invention. A preferred group 440 for member A is determined, as described above, by social network 400. Preferred group 440 contains a subgroup designated as mutual attraction group 450, which is determined by identifying which of the members in preferred group 440 also have member A in their respective preferred group.

In one embodiment, preferred groups for other members, such as B and X, are determined in the same manner as preferred group 440. The preferred groups of members in preferred group 440 are then searched to find out whether these preferred groups contain member A. As shown, the preferred group 420 for member B contains member A. Also, as shown, the preferred group 430 for member X contains member A. Thus, the mutual attraction group 450 for member A can be determined by identifying members (such as B and X) in the preferred group 440 of member A that have member A in their respective preferred groups.

In another embodiment, for each member in the preferred group 440, the same algorithm (such as method 200) is run in reverse. This may be done dynamically when the mutual attraction group 450 is to be determined. As mentioned above, these resulting preferred groups are then searched for member A. The search yields the subset 450 of the initial attraction group 44 that is also attracted to member A. This subset is the mutual attraction group 450 for the active user, comprising individuals who are both attracted to each other.

Figure 5:
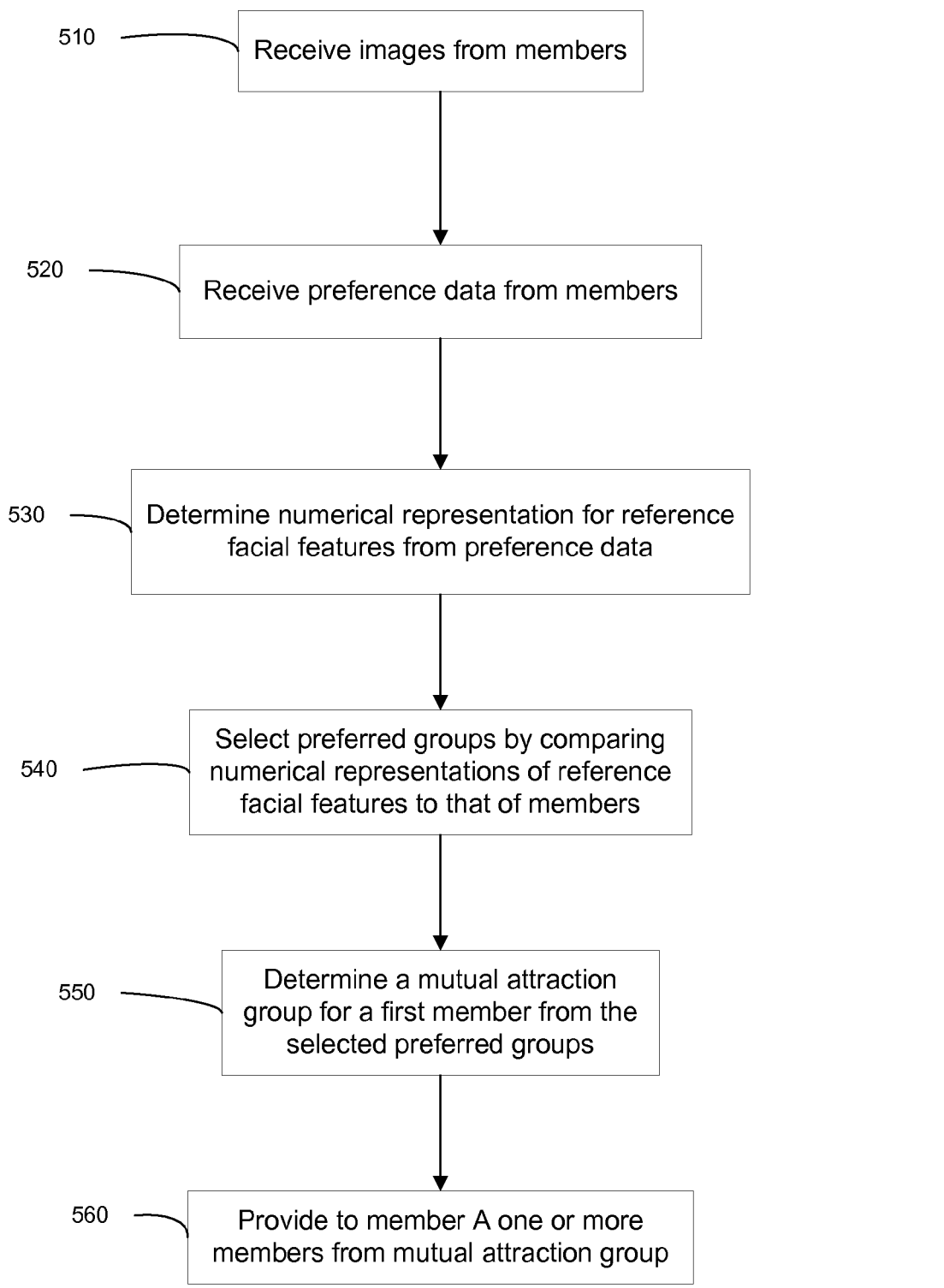
FIG. 5 is a flow diagram illustrating a method for pairing mutually attracted members of an online social network according to an embodiment of the present invention.

FIG. 5 is a flow diagram illustrating a method 500 for pairing mutually attracted members of an online social network according to an embodiment of the present invention. In step 510, images from a plurality of the members are received, e.g. by social network 400. At least one of the images for each member includes a face, and certain actions as described above may be performed on the images.

In step 520, preference data from the members are received, e.g., by social network 400. The respective preference data conveys information regarding one or more facial images to the respective member is attracted. The preference data may be sent and received in any suitable manner, such as those described herein. The preference data can be generated via explicit or implicit feedback as described herein. In conjunction with a member's preference data, preferences of multiple users may be used to estimate a member's preferences on unseen images.

In step 530, a numerical representation for each of one or more reference facial features to which a member is attracted are determined from the preference data. This may be performed by a comparison module or by another processing module of social network 400. A facial decomposition may be performed to extract features from faces of sample images rated, ranked, or provided by a member and to determine the respective numerical representations.

In step 540, a preferred group of members is selected for each of at least a portion of members. In one embodiment, the portion of the members is all of the members for which images have been received. In another embodiment, the portion of the members is only a first member and the members in the preferred group of the first member. The preferred group may be determined by comparing numerical representations of each member to the numerical representations for the reference facial features for that member. The comparison may be performed as described herein. The preference data may also indicate that a feature is not only preferred by required, also as described herein.

In step 550, a first mutual attraction group for a first member is determined from at least a portion of the selected preferred groups. In one embodiment, the determining of the first mutual attraction group includes determining whether a member in the preferred group of the first member has the first member in that member's preferred group. As mentioned above, members can also be matched using other factors, such as events that are attended by mutually attracted members or common interests as indicated in a profile.

In step 560, one or more members of the first mutual attraction group are provided to the first member. The members may be provided as described herein. Also, as described above, a specified number of members may be provided to a first member periodic or semi-periodic basis, e.g. each day. Also, other information may be sent, such as rankings within a preferred group or a level of common interests.

Accordingly, embodiments provide a social network setting that connects users on the basis of their facial mutual attraction in combination with mutual shared interests, personalities, general life habits and goals. The online social network can also provide chatting, messaging, gestures, sharing media content, telephony, and facilitating of offline activities.

Figure 6:
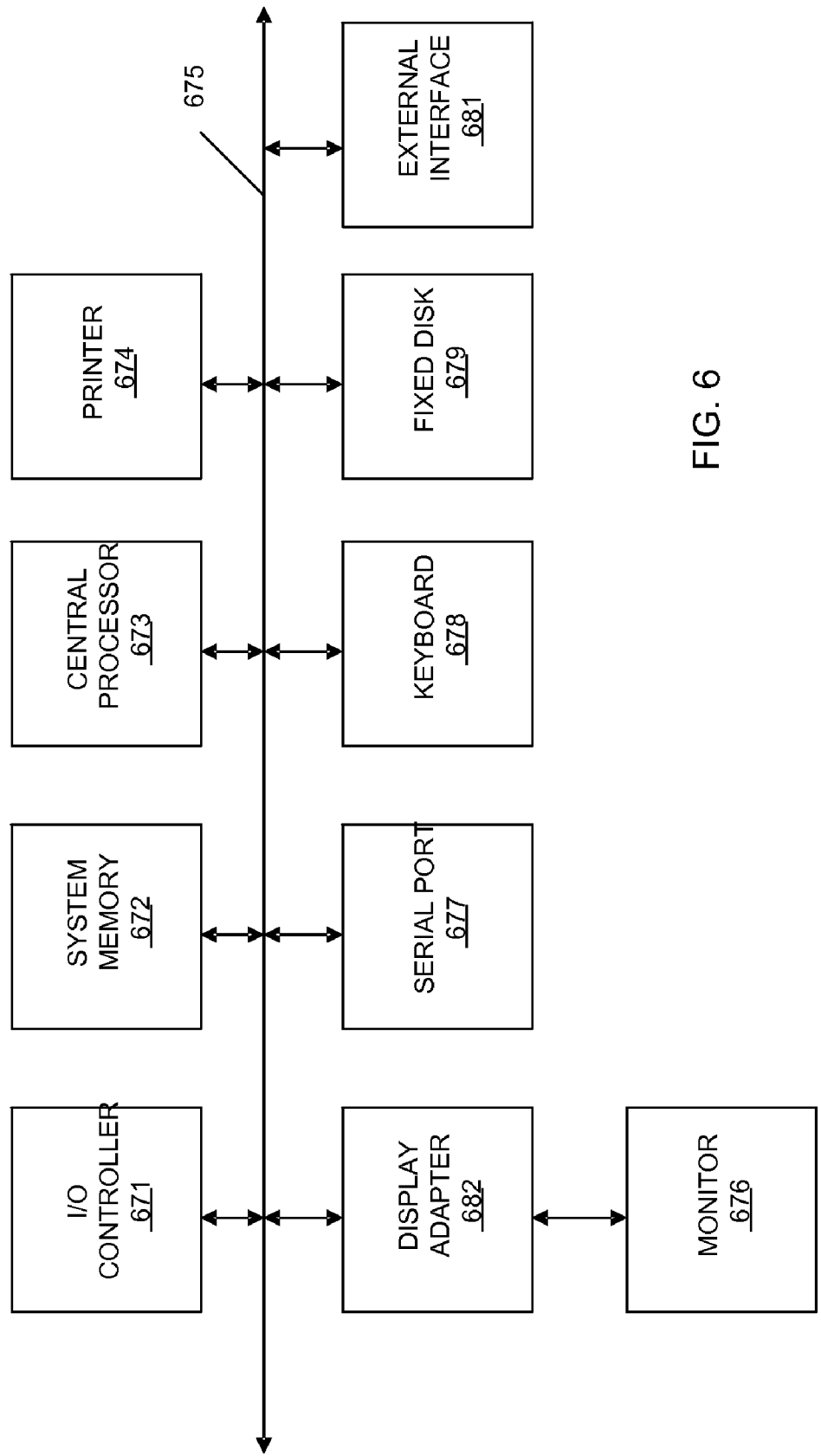
FIG. 6 shows a block diagram of an exemplary computer apparatus usable with system and methods according to embodiments of the present invention.

Any of the online social networks 100 or 400 or computer systems used by any of the members may utilize any suitable number of subsystems. Examples of such subsystems or components are shown in FIG. 6. The subsystems shown in FIG. 6 are interconnected via a system bus 675. Additional subsystems such as a printer 674, keyboard 678, fixed disk 679, monitor 676, which is coupled to display adapter 682, and others are shown. Peripherals and input/output (I/O) devices, which couple to I/O controller 671, can be connected to the computer system by any number of means known in the art, such as serial port 677. For example, serial port 677 or external interface 681 can be used to connect the computer apparatus to a wide area network such as the Internet, a mouse input device, or a scanner. The interconnection via system bus allows the central processor 673, which may include one or more processors, to communicate with each subsystem and to control the execution of instructions from system memory 672 or the fixed disk 679 (such as a hard drive or optical disk), as well as the exchange of information between subsystems. The system memory 672 and/or the fixed disk 679 may embody a computer readable medium.

IV. Advertising Showing a Face to Which a Person is Attracted

Embodiments of the invention can also leverage data on user facial preferences to tailor faces appearing in advertisements. For example, if there is an inventory of 12 advertisements for a given product, and each ad contains a different face, the method will display the advertisement with the face most appealing to an individual user. Thus, embodiments provide technology which enables automatic display an appealing face to associate with a product.

Figure 7:
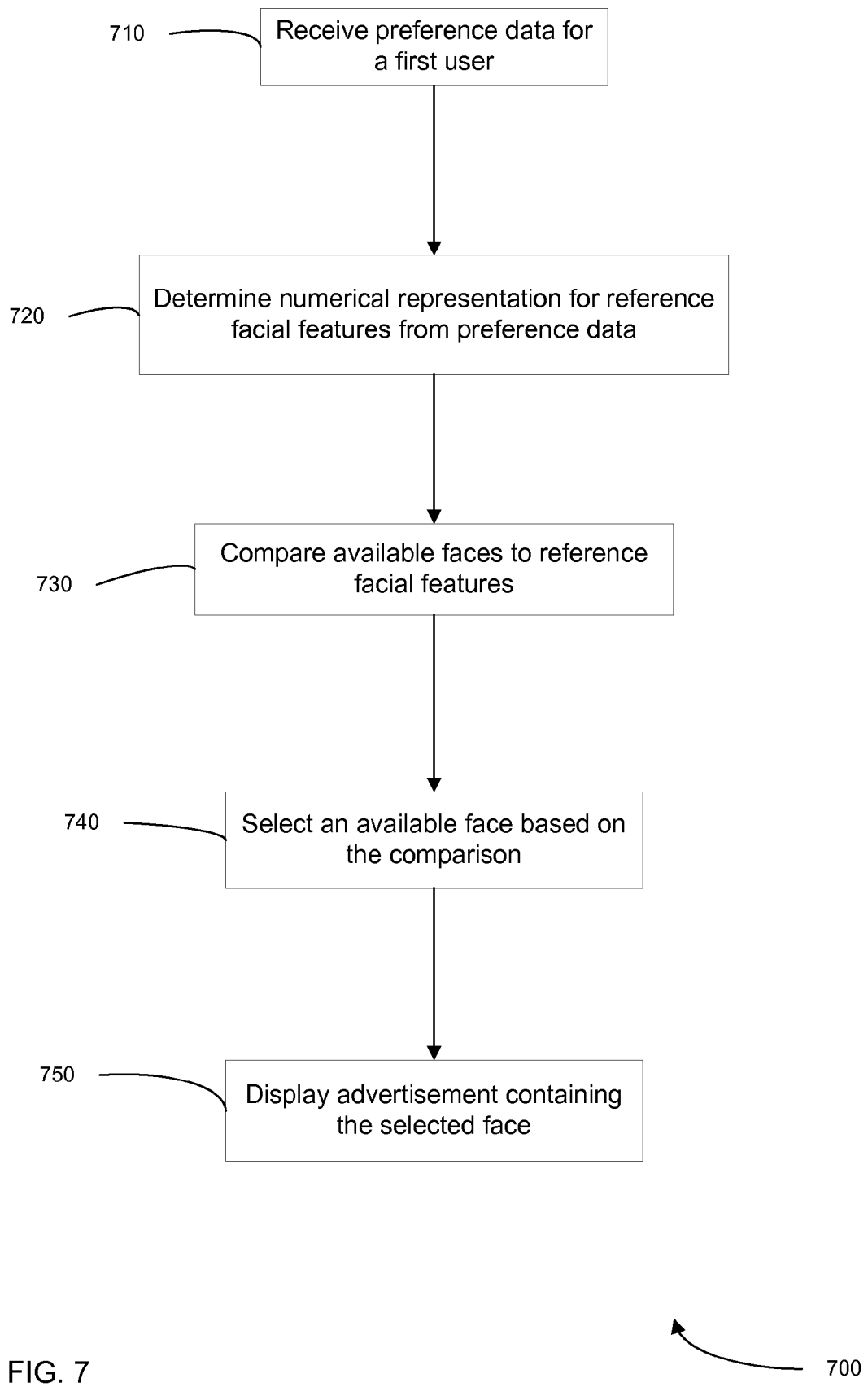
FIG. 7 is a flow diagram illustrating a method for providing an advertisement the method according to an embodiment of the present invention.

FIG. 7 is a flow diagram illustrating a method 700 for providing an advertisement the method according to an embodiment of the present invention. The advertisement advantageously contains a face that has a high probability of being attractive to the recipient of the advertisement. Thus, the recipient will tend to view the advertisement favorably.

In step 710, preference data relating one or more facial images to which the first user is attracted is received. The preference data may be of any type and received by any means as discussed herein.

In step 720, a numerical representation for each of one or more reference facial features to which the first user is attracted is determined from the preference data. The numerical representations and the reference facial features may have characteristics as described herein.

In step 730, numerical representations of facial features from face images that are available for displaying in an advertisement are compared to the numerical representations for the reference facial features. For example, there may be a catalogue of different faces that an advertiser or an agent of the advertiser has the rights to present in an advertisement. Each of these available faces are then compared to the reference facial features via the numerical representations.

In one embodiment, the user is a member of an online social network. The catalogue of available faces can include other members of the online social network. In another embodiment, the comparison includes a ranking in similarity of the faces available to the reference facial features, a relative similarity measure between the faces, or an absolute similarity measure in relation to a similarity of the faces to the reference facial features.

In step 740, a face is selected from the facial images that are available for displaying in an advertisement. The selecting is based on the comparison performed. In one embodiment, the selected face is the face that is ranked the highest or has the best similarity measure. In another embodiment, the selected face is ranked above a threshold, such as in the top 10% or one of the top N faces. In yet another embodiment, the selected face has a relative or absolute similarity measure greater than or less than a threshold value, or even equal to the threshold value if desired.

In step 750, an advertisement displaying the selected face is provided to the first user. In one embodiment, a completed (rendered) advertisement having the selected face is selected from a set of available advertisement. In another embodiment, only part of the advertisement is pre-rendered, and a part including the selected face is rendered upon selection. In yet another embodiment, the advertisement is rendered only upon selection of the face.

In one embodiment, the advertisement is provided to the person when the person is viewing an electronic display, as would occur when the person is viewing a Web page online. The Web page may be associated with a dating or online social networking site. Before sending the advertisement, it may determined when the person is online and then the advertisement is sent when the person is online. In one aspect, a user password, other login information, or tracking information is used to determine when the person is online, using a computer, or viewing a particular Web site.

In another embodiment, a cookie is placed on the person's computer, and this cookie can tell when the computer is being used. For example, it may be determined that the person is using a web browser to use a shopping search engine or recommendation engine. In one aspect, the cookie may then prompt, e.g. with a signal, for an advertisement to be sent from a server to the person's screen. Data regarding the user's attributes and preferences may be stored at the server. In another aspect, the cookie provides only preference and/or attribute data to a server at the request of the server.

In yet another embodiment, the advertisement is sent to the person through postal mail. In yet another embodiment, the advertisement is sent to the person via an e-mail containing the advertisement. In yet another embodiment, the advertisement is sent substantially contemporaneously in time from when the image data is taken. For example, as the person walks by the camera, the advertisement could then be shown on an electronic display that is along the path that the person is walking. Other aspects of such advertisement is described in U.S. Application No. 60/978,894, which is referenced above.

Additionally, the advertisement can include a product that is used or otherwise associated with the faces that the first user is attracted.

In one embodiment, one or more images that each include at least one face are received. These images may be those sent by members of an online social network. It is determined which people in the images that the first user is attracted to based on the faces. This may be done by comparing numerical representations of facial features of the faces in the images to the numerical representations for the reference facial features to determine faces to which the first user is attracted.

From the photos containing a person that the first user is attracted, physical objects that appear in proximity to people in the images whose faces that the first user is attracted are identified. In one aspect, a general direction of a person's body with respect to the objects in the image is determined. The advertisement may thus be tailored to incorporate aspects of the identified physical objects. For example, the advertisement provided to the first user can be directed to selling at least one of the identified physical objects.

Similarly identified objects in images of a first member of an online social network and objects identified in images of other members may be used to identify a preferred group and/or a mutual attraction group.

The specific details of the specific aspects of the present invention may be combined in any suitable manner without departing from the spirit and scope of embodiments of the invention. However, other embodiments of the invention may be directed to specific embodiments relating to each individual aspects, or specific combinations of these individual aspects.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. Computer programs incorporating features of the present invention may be encoded on various computer readable media for storage and/or transmission; suitable media include magnetic disk or tape, optical storage media such as compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method of providing an advertisement, the method comprising:
    receiving preference data relating one or more facial images to which a first user is attracted;
    from the preference data, determining a numerical representation for each of one or more reference facial features to which the first user is attracted;
    comparing numerical representations of facial features from face images that are available for displaying in an advertisement to the numerical representations for the reference facial features;
    based on the comparison, selecting a face from the face images that are available for displaying in an advertisement;
    providing to the first user an advertisement displaying the selected face;
    receiving one or more images that each include at least one face;
    determining people in the images whose faces that the first user is attracted; and
    identifying physical objects that appear in proximity to people in the images whose faces that the first user is attracted,
    wherein the advertisement provided to the first user is directed to selling at least one of the identified physical objects.

2. The method of claim 1, wherein the first user is a member of an online social network, and wherein the face images that are available for displaying in an advertisement include other members of the online social network.

3. The method of claim 1, wherein at least a portion of the advertisement is pre-rendered with the selection of the face remaining not rendered.

4. The method of claim 1 wherein determining people in the images whose faces that the first user is attracted includes comparing numerical representations of facial features of each of a plurality of faces to the numerical representations for the reference facial features to determine faces to which the first user is attracted.

* * * * *